Nov. 3, 1931.    G. G. SWANK    1,830,449
CONTINUOUS WIRE SUPPLY SYSTEM
Filed Feb. 3, 1930    2 Sheets-Sheet 1
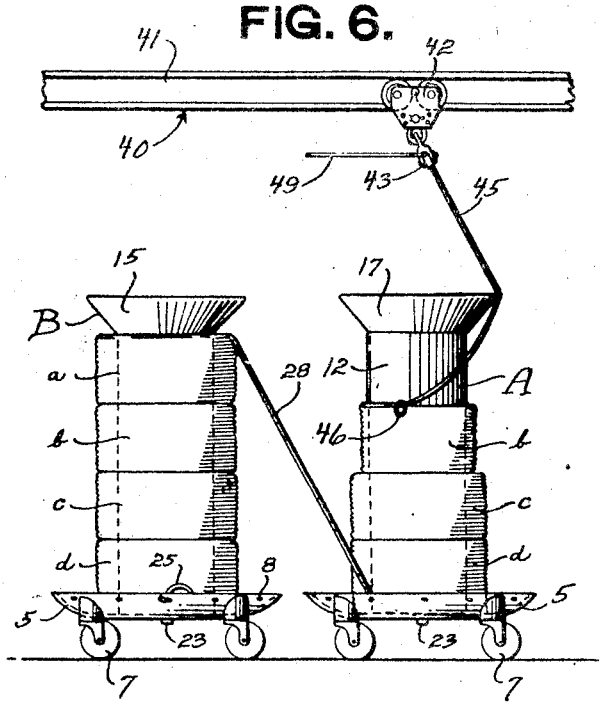
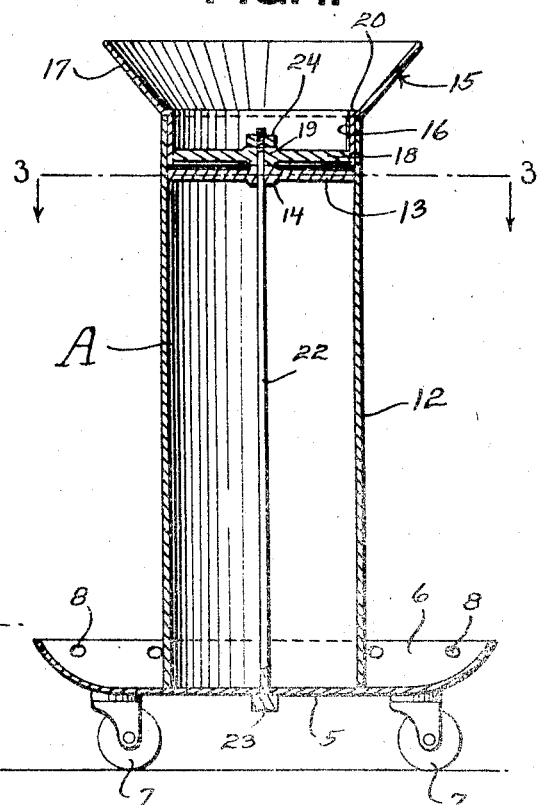
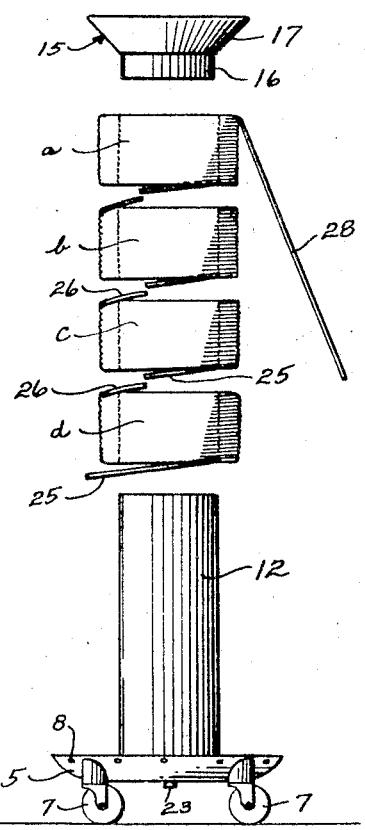
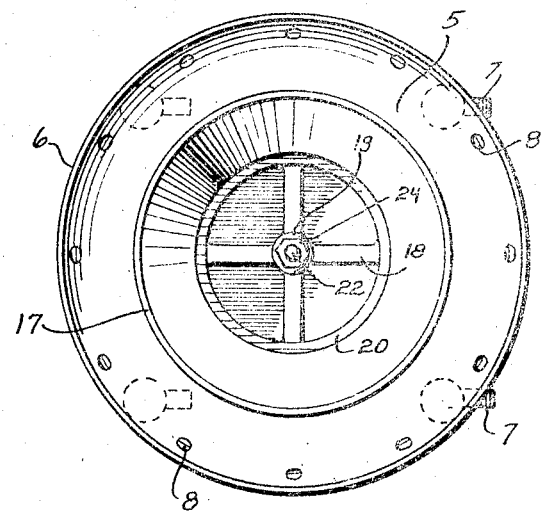
INVENTOR.
George G. Swank
BY Lancaster Allwine and Rommel
ATTORNEYS.

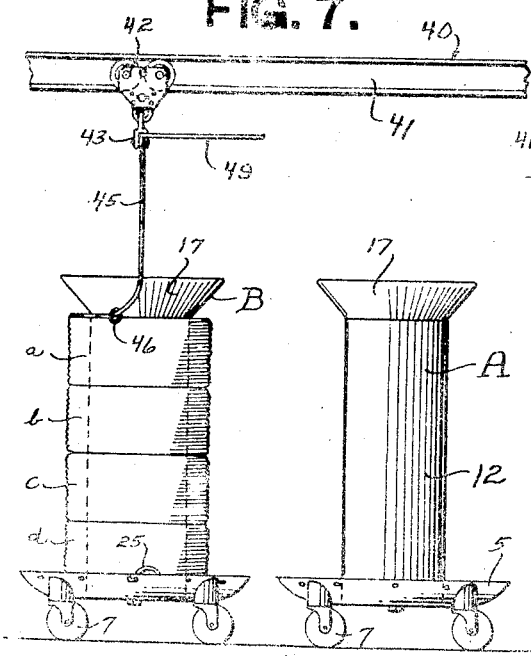
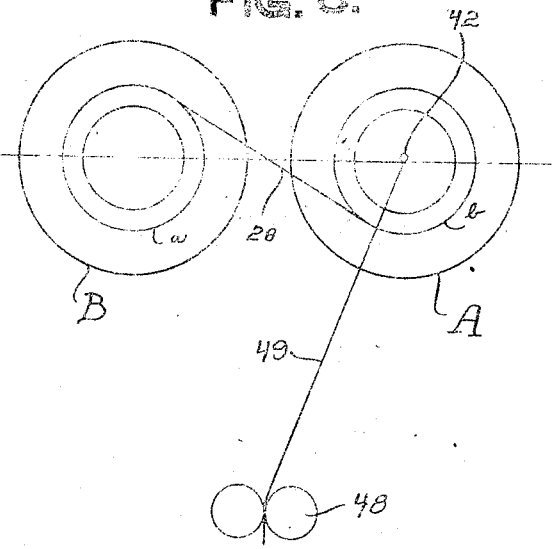
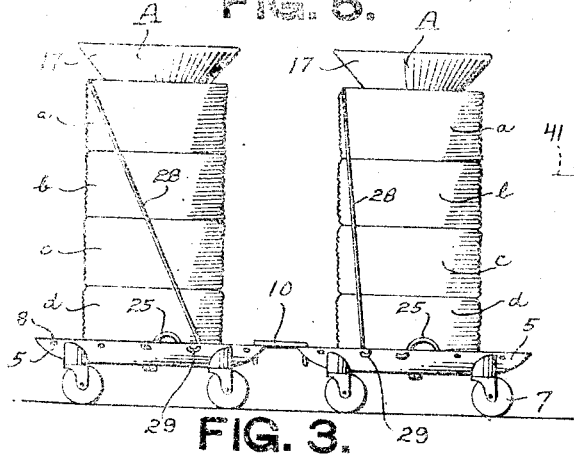
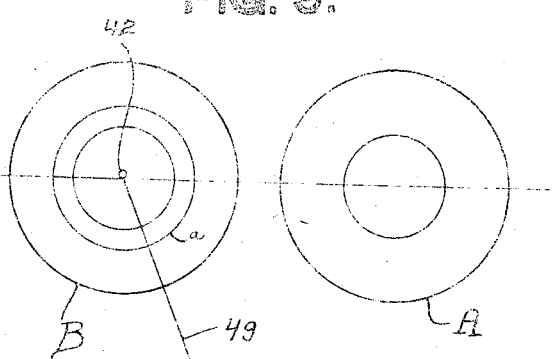
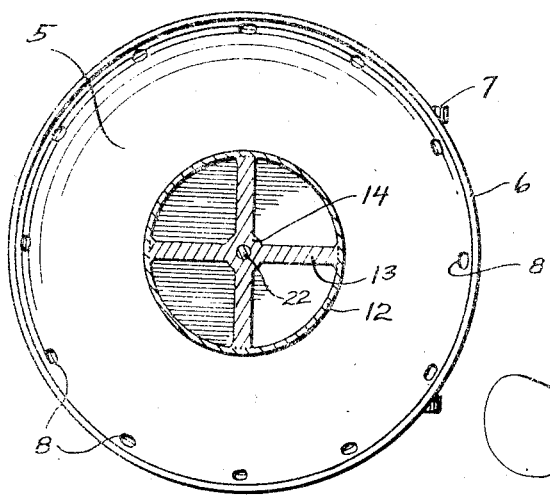

Patented Nov. 3, 1931

1,830,449

UNITED STATES PATENT OFFICE

GEORGE G. SWANK, OF CRAWFORDSVILLE, INDIANA

CONTINUOUS WIRE SUPPLY SYSTEM

Application filed February 3, 1930. Serial No. 425,668.

The present invention relates to wire handling apparatus for coiled wire and the primary object of the invention is to provide a wire supply system for continuous feeding of wire to machines such as wire fence making machines and other wire product producing machines.

A further object of the invention is to provide a continuous wire supply system which will permit continuous operation of the machine thus doing away with all necessity of stopping the machine to rewire, resulting in a considerable saving in time and labor, and eliminating practically all waste.

Wire produced for the trade is in most instances wound upon a supporting form such as a spool or reel, but this is not the usual case where the wire is produced solely as a step in the manufacturing of wire fencing or other wire formed products. In the latter case, the wire is simply wound into a coil upon what is known as a wire block and from which the entire bundle or coil of wire is removed with no supporting form. The coils or bundles of wire are then placed upon trucks or other suitable conveyors and transferred to different departments or subjected to various treatments such as galvanizing or the like.

It is therefore a further object of this invention to provide improved means for handling one or more bundles of coiled wire in an efficient manner and permitting of the bundles being connected in a single continuous strand for feeding to a machine producing the product desired to be formed by the wire.

A further object of the invention is to provide an improved continuous wire supply system embodying transporting devices for handling of the wire and from one or any desired number of which the wire may be drawn in a continuous strand.

Briefly, the invention resides in the provision of a trucked stem adapted to support one or more coils of wire having their ends welded together to form an endless strand, and an arrangement permitting the coils of wire carried by one stem to be connected with the coils of wire supported by the second stem whereby upon the emptying of the wire from one stem the feed is continued from the second stem.

Other objects and advantages of the invention will be apparent during the course of the following detailed description, taken in connection with the accompanying drawings forming a part of this specification and in which drawings:

Figure 1 is a central vertical section thru one of the carriers.

Figure 2 is a top plan view of the carrier.

Figure 3 is a section on line 3—3 of Figure 1.

Figure 4 is a view showing the manner of mounting a number of coils of wire upon the carrier stem.

Figure 5 is a view showing two of the carriers connected for movement as a unit.

Figure 6 is a view showing the carriers in use and with the bottom coil of one carrier connected with the top coil of the co-acting carrier.

Figure 7 is a view showing the wire having been exhausted from one carrier as in Figure 6 and the feed transferred to the companion carrier.

Figures 8 and 9 are diagrammatic views of Figures 6 and 7 respectively showing the manner in which the feed is transferred from one carrier to another.

The carrier A for supporting and transporting the coil or coils of wire may be made in various sizes in accordance with the size of the coils of wire to be used and may be made of any suitable material. In the example illustrated, the carriers have been shown of a size suitable for receiving four bundles of wire a, b, c and d in stacked formation one upon another and of about three hundred pounds each. It is of course to be understood that one or any desired number of coils of wire may be mounted upon each carrier.

The carrier A is formed with a dished base or bottom plate 5 which may be formed from a metal disc having its peripheral edge upturned as at 6. The base 5 is preferably supported upon four suitable casters 7. The upturned edge 6 is provided with a series of evenly spaced apart apertures 8 any one of which is adapted to receive one end of an inverted U-shaped coupling link 10 as shown in Figure 5, whereby two or more of the carriers may be connected together and moved as a unit.

Mounted axially of the base 5 is a cylindrical, preferably tubular stem 12 and which may be welded or otherwise secured at its lower end to the base concentric with the upturned edge 6. Mounted within and adjacent the upper end of the tubular stem 12 is a spider 13 having an apertured hub portion 14. The arms of the spider 13 are preferably welded to the inner surface of the stem 12.

Removably fitting in the upper end of the stem 12 is a wire retainer cap 15 embodying a tubular sleeve portion 16 from the upper end of which is an outwardly flaring frusto-conical shaped head portion 17. The sleeve portion 16 is of a diameter to be slidably fitted in the upper end of the tubular stem 12 while the uppermost end of the flaring head portion 17 is of a diameter slightly greater than the diameter of the coils of wire adapted to be mounted upon the stem 12. Mounted in the lower end of the sleeve 16 is a spider 18 having an apertured hub portion 19 arranged in axial alignment above the apertured hub 14 of the spider 13. At the juncture of the sleeve 16 and flaring head portion 17, the cap 15 is preferably formed with a flat annular shoulder 20 adapted to rest upon the upper edge of the stem 12.

The retainer cap 15 is retained in position upon the upper end of the stem 12 by means of a tie rod 22 preferably in the form of a long bolt inserted upwardly thru the base 5 axially of the stem 12 with its threaded upper end projecting thru the aligning hubs 14 and 19. The head 23 of the tie rod or bolt is preferably welded to the base 5 for retaining the bolt against dropping during removal and placing of the cap 15. A nut 24 is threaded upon the upper end of the rod 22 and is turned into engagement with the hub 19 for securely retaining the cap in position. The wire retainer cap 15 is made removable to permit ready placing of the coils of wire upon the stem 12 and attaching of the cap to the stem is necessary to prevent displacement of the cap by the wire being drawn from the coils.

Referring particularly to Figure 4 showing the manner of loading one of the carriers, the wire retainer cap 15 is first removed to permit the independent coils of wire a, b, c and d to be slipped downwardly over the stem 12, and rest upon the base 5. The first bundle of coiled wire d is slipped downwardly over the stem 12 and the loose inside end 25 of this coil is either looped or hooked into one or more of the apertures 8 in the upturned edge 6 of the base 5 for preventing tangling of the wire and also disposing the loose inside end 25 at a readily accessible location for welding. After the first coil d has been placed on the stem 12 the second coil c is lowered over the stem and the loose inside end 25 of this coil is welded to the loose outside end 26 at the top of the underlying coil d. After so doing, the coils b and a are placed in stacked position above the coils c and d with the loose inside end of the coil b welded to the loose outside end of the coil c and the loose inside end of the coil a welded to the loose outside end of the coil b. After the desired number of coils have been connected in a continuous strand upon the stem, the free outside end 28 of the top bundle or coil is brought down and looped thru one of the apertures 8 as at 29 in Figure 5.

Referring now to Figure 5 it will be seen that the two loose or free ends of the connected series of coils of wire are so connected with the plate 5 as to prevent uncoiling and tangling of the wire during transportation of the wire. Thus the series of apertures 8 not only act with the coupling link 10 for coupling two or more of the carriers together to be moved at one time, but also provide ready means for attaching the loose ends of the connected coils. After the coils have been mounted in stacked formation upon the stem 12 the cap 15 may be replaced and secured by means of the nut 24. The coils of wire after being so mounted and connected upon the carriers may be readily transported to the desired place for use where it is desirous of furnishing a continuous supply of wire to a machine utilizing the wire for production of any kind of wire formed products.

The carriers after having the connected coils of wire mounted thereon are wheeled or rolled to the machine for use and are placed beneath a guide or feed means 40 serving to guide the strand of wire from the carriers to the machine. This guide or feed means 40 embodies a horizontally disposed track or runway 41 having mounted for free movement therealong a suitable truck 42 carrying a suitable sheave or pulley 43 in depending relation therefrom. The truck or runway 41 is mounted at an elevation above the height of the carriers A and the carriers are wheeled to a position directly beneath the track or runway as diagrammatically shown in Figures 8 and 9. As will be observed in Figures 8 and 9 two of the carriers are arranged side by side directly beneath the track.

For the purpose of explanation, the pair of carriers shown in Figures 6 and 7, and diagrammatically in Figures 8 and 9 have been designated as A and B. After properly positioning the carriers A and B beneath the horizontal track 41, the free outside end 28 of the uppermost coil of wire on the carrier B is disconnected from its temporary connection to the base 5 and welded to the loose inside end 25 of the bottom coil of wire on the carrier A after disconnecting the end 25 from its temporary connection with the base 5. The free outside end 28 of the uppermost coil on the carrier A is then detached from the base 5 and before being passed thru the pulley 43 as at the strand of wire 45, is passed thru the ring 46 which varies in weight according to the size of the wire and this ring co-acts with the wire retainer cap 15 for holding the wire in its coiled form about the stem 12 and against being drawn upwardly in a bunch over the top of the carrier. The wire after passing thru the pulley 43 may either be fed thru guide rollers 48 as at 49 or led directly to the machine if the machines are so located as to permit the carriers to be properly arranged in front of the machines.

While the wire is being withdrawn from the carrier A, the truck 42 will center itself above the carrier A so that the feeding wire 45 is drawn over the upper edge of the flaring head 17. This dragging of the wire over the upper edge of the head 17 creates a drag upon the wire sufficient to prevent the wire from uncoiling too freely from about the stem 12. The coils of wire remain stationary on the carriers during emptying of the carriers and the ring weight 46 is so carried about the stem during uncoiling of the wire as to hold the uncoiling convolution down upon the bundle and also create a further drag to prevent uncoiling of the wire. As will be observed, the ring 46 is normally moved by gravity into engagement with the coil of wire and will have a dragging action as the ring is moved about the coil.

In Figure 6, after the coil d on the carrier A has been used up the connecting wire 28 leading to the upper end of the coil a on the carrier B will be drawn thru the pulley 43 and cause the truck 42 to be moved along the track 41 to a position centered above the carrier B as shown in Figure 7. As in Figure 7, the carrier A is now free of all connections with the carrier B and may be removed and a loaded carrier substituted in its place beneath the track 41. With the loaded carrier in the position of the carrier A in Figure 7, the free outside end 28 of its uppermost coil is then welded to the loose inside end 25 of the lowermost coil on the carrier B so that a continuous wire supply is furnished permitting continuous operation of the machine.

In present practice, all hardwire is fed to the machines from reels which are rotated thru unwinding of the wire and this constant motion prevents welding the ends of the wire and requires that the machine be stopped and rewired when each bundle or coil of reeled wire is run out. With the arrangement herein shown, the coils of wire are held stationary on the carriers and the wire withdrawn over the upper end of the stems thus permitting ready welding of the upper end of the loaded carrier to the lower end of the carrier which is in use. This arrangement permits continuous operation of the machine by allowing a continuous supply of wire being fed to the machine.

Thus it will be seen that a novel arrangement has been disclosed which will permit a continuous wire supply be fed to the machine. It will also be apparent that a novel form of carrier has been provided for so supporting the coils of wire as to permit the coils of wire upon two or more carriers to be welded to produce an endless strand.

Changes in detail may be made to the form of invention herein shown and described, without departing from the spirit of the invention or the scope of the following claims.

I claim:

1. In a continuous wire supply system for wire product producing machines, guide means embodying a horizontally movable take-off pulley having a straight path of movement, and a plurality of wheeled wire carriers arranged beneath the pulley in alignment with the direction of travel of the pulley, said carriers each embodying a vertically disposed stem for receiving coils of wire connected in a continuous run and with the end of the lowermost convolution on one carrier joined to the uppermost convolution of the next adjacent carrier.

2. In a continuous wire supply system for wire product forming machines, guide means embodying a horizontally fixed track way, a truck freely movable in either direction along the track way, a guide pulley carried by the truck for directing wire to the machine, and wheeled wire carriers arranged in aligning relation beneath the track way, said carriers each embodying a vertically disposed stem for receiving connected coils of wire in stacked formation thereon and with the lower end of the wire on one carrier connected with the upper end of the wire on the next adjacent carrier.

3. In a continuous wire supply system for wire product forming machines, guide means embodying a horizontally movable take-off pulley, and wire carriers arranged beneath the take-off pulley in alignment with the direction of movement of the pulley each embodying a fixed vertical stem portion for receiving connected coils of wire in stacked formation thereon, the lower end of the coiled wire on one stem to be welded to the upper end of the coiled wire on the stem of the next carrier to be brought into use, and a wire retainer cap detachably fixed on the upper end of the stem portion of each carrier having upwardly and outwardly flaring head portions, the upper ends of which being of greater diameter than the diameter of the coils of wire upon the stems.

4. A carrier for coiled bundles of wire comprising a dished base, ground wheels supporting the base, a tubular stem mounted vertically on the base, a removable cap having a portion insertable into the upper end of the stem and a flaring portion projecting above the stem, and means for securing the cap in position in the upper end of the stem.

5. A carrier for coiled bundles of wire comprising a dished base, ground wheels supporting the base, a tubular stem mounted vertically upon the base, a spider mounted in the upper end of the stem, a retainer cap embodying a sleeve portion insertable into the upper end of the stem and a flaring head portion extending above the stem, a spider secured in the sleeve portion for positioning above the spider in the stem, and means extending thru the overlying spiders for removably securing the cap to the stem.

6. A carrier for coiled bundles of wire comprising a dished base, ground wheels supporting the base, a tubular stem mounted vertically upon the base, a spider mounted in the upper end of the stem, a retainer cap embodying a sleeve portion insertable into the upper end of the stem and a flaring head portion extending above the stem, a spider secured in the sleeve portion for positioning above the spider in the stem, a tie rod secured at its lower end to the base and extending axially thru the stem and having a threaded upper end extending thru the hub portions of the overlying spiders, and a nut threaded upon the upper end of the tie rod for removably securing the cap to the stem.

7. A carrier for coiled bundles of wire comprising a dished plate portion providing an upturned marginal edge, said upturned edge being provided with a series of openings, a hollow stem mounted vertically on the base concentric to the axis thereof, a retainer cap for positioning in the upper end of the stem and embodying a flaring head portion, means for attaching the cap against withdrawal from the stem, and casters secured to the under side of the base portion.

8. In a continuous wire supply system, a plurality of wheeled wire carriers each embodying a dished base portion providing an upturned marginal edge provided thruout with a series of apertures, a cylindrical stem supported vertically on the base, and a removable retainer cap carried by the upper end of the stem and having a flaring head portion, a coupling link insertable thru the apertures of the base portions of the carriers for connecting the carriers in tandem, said stem portions of the carriers to receive connected coils of wire in stacked formation thereon with the lower end of the wire on each stem connected with the upper end of the wire on the stem of the carrier arranged rearwardly thereof.

GEORGE G. SWANK.